US006357963B1

(12) United States Patent
Abe et al.

(10) Patent No.: US 6,357,963 B1
(45) Date of Patent: Mar. 19, 2002

(54) CONCRETE FOR JOINTING AND METHOD OF JOINTING USING SAID CONCRETE

(75) Inventors: Yoichi Abe; Shoichi Kameta, both of Narita; Ryoichi Sato, Higashihiroshima; Satoshi Tanaka; Rokuro Tomita, both of Sakura, all of (JP)

(73) Assignee: New Tokyo International Airport Authority, Chiba (JP)

( * ) Notice: Subject to any disclaimer, the term of this patent is extended or adjusted under 35 U.S.C. 154(b) by 0 days.

(21) Appl. No.: 09/446,158

(22) PCT Filed: Apr. 15, 1999

(86) PCT No.: PCT/JP99/02011

§ 371 Date: Dec. 17, 1999

§ 102(e) Date: Dec. 17, 1999

(87) PCT Pub. No.: WO99/54264

PCT Pub. Date: Oct. 28, 1999

(30) Foreign Application Priority Data

Apr. 17, 1998 (JP) ............................. 10-124166

(51) Int. Cl.$^7$ ............................................. E01C 23/00
(52) U.S. Cl. ............................. 404/75; 404/72; 404/17
(58) Field of Search ......................... 404/17, 72, 75, 404/27; 106/696, 724, 725, 728, 823

(56) References Cited

U.S. PATENT DOCUMENTS

| | | | | |
|---|---|---|---|---|
| 3,642,506 A | * | 2/1972 | Johnson | 106/664 |
| 4,046,582 A | * | 9/1977 | Kawamura et al. | 106/657 |
| 4,466,834 A | * | 8/1984 | Dodson et al. | 106/728 |
| 5,181,961 A | * | 1/1993 | Umaki et al. | 106/724 |
| 5,551,976 A | * | 9/1996 | Allen | 106/725 |
| 6,126,875 A | * | 10/2000 | Watanabe et al. | 264/40.4 |

FOREIGN PATENT DOCUMENTS

| | | |
|---|---|---|
| JP | 53-85931 | 7/1978 |
| JP | 3-37146 | 2/1991 |
| JP | 5-194003 | 8/1993 |
| JP | 8-277156 | 10/1996 |
| JP | 9-71902 | 3/1997 |
| WO | 99/55635 | * 11/1999 |

OTHER PUBLICATIONS

Walter D. Munn; "Bonded Concrete Overlays Resurface Busy Freeway"; Highway & Heavy Construction; Oct. 1989; pp. 58–60.
Patent Abstracts of Japan; Publication No. 08277156, published Oct. 22, 1996.
Patent Abstracts of Japan, Publication No. 05194003, published Aug. 3, 1993.
Concrete Manual (Second Edition), by Japan Concrete Engineering Association, published by Gihodo, copyright Feb. 15, 1996.
Patent Abstracts of Japan, Publication No. 09071902, published Mar. 18, 1997.

* cited by examiner

*Primary Examiner*—David Bagnell
*Assistant Examiner*—Frederick L. Lagman
(74) *Attorney, Agent, or Firm*—Rosenthal & Osha L.L.P.

(57) ABSTRACT

Provided is an overlay concrete which is good in bond to existing concrete fabrics and satisfies properties such as strength, durability and workability. The overlay concrete of the present invention comprises an AE water reducing agent or superplastisizer, and has a slump of 2 to 8 cm, a cement-water ratio of 35 to 45%, and a sand-coarse aggregate ratio of 36 to 42%.

8 Claims, 2 Drawing Sheets

CONCRETE FOR JOINTING AND METHOD OF JOINTING USING SAID CONCRETE

FIELD OF THE INVENTION

The present invention relates to an overlay concrete for overlaying existing concrete fabrics to repair or remodel the fabrics, and a bonded overlay rehabilitation method using the overlay concrete. The present invention relates in particular to a bonded overlay rehabilitation method using an overlay concrete suitable for the use in a bonded overlay rehabilitation method or the like which is performed in repair work of concrete fabrics, in particular, concrete pavements of a runway, a road or the like.

BACKGROUND ART

Recently, in repair work of existing concrete fabrics having a surface layer strength lowered by cracks or crevices based on an increase in the wheel load, or exposure of aggregates, for example, in repair work of fabrics such as a paved runway or road, a so-called bonded overlay rehabilitation method has been adopted. In the bonded overlay rehabilitation method, the surface of the existing concrete fabrics is overlaid with a new concrete to form a concrete layer having a given thickness on the existing concrete fabrics.

Hitherto, therefore, various investigations have been made to improve bond strength in the joint interface.

For example, Japanese Patent Application Laid-Open No. 9-71902 discloses a bonded overlay rehabilitation method of jetting highly-pressured water on the surface of an existing concrete by water jet to form macro-texture, jetting a large number of small and hard balls composed of a metal such as iron onto the macro-texture by shot blast to form micro-texture, and overlaying the surface of the existing concrete, which has the macro-texture and the micro-texture, with a new concrete to form a concrete layer having a given thickness on the surface of the existing concrete.

According to this bonded overlay rehabilitation method, the surface of the existing concrete, which will be a joint interface, has numerous macro-texture and micro-texture; therefore, the new concrete for the overlay is inserted in a wedge manner into the texture so that the bond strength in the joint interface can greatly be improved. Further, the macro-texture and the micro-texture at the surface of the existing concrete are formed by combination of water jet and shot blasting and, therefore, the formation of the texture at the surface of the existing concrete is easy and prompt and does not make the strength of the surface layer thereof weak. Thus, the bonded overlay rehabilitation method has advantages such as remarkable shortening of construction period.

However, the above-mentioned publication never discloses properties which the new concrete for overlaying the surface of the existing concrete be should have in order to repair or remodel it (The new concrete will be referred to as an "overlay concrete"). As to what properties the overlay concrete should have in order to raise the bond strength optimally, therefore, there has remained a room for investigation.

For example, even if texture is formed at the surface of an existing concrete to improve bond in the case that the flowability of the overlay concrete is low, filling performance of the concrete into the texture is bad. Thus, it appears that the bond strength of the joint interface cannot be improved. On the other hand, in the case that the used overlay concrete contains a large amount of water to increase its flowability, delamination (separation) or stress arises in the joint interface, resulting from drying shrinkage at the time of hardening of the concrete. Thus, it appears that the bond strength in the joint interface deteriorates. Scraps generated at the time of forming the texture, dust from the outdoors, and the like are present on the surface of the existing concrete fabrics. Thus, it appears that the bond is deteriorated by these scraps.

From these viewpoints, special properties of flowability, drying shrinkge, involvement performance of the scraps and the like, which are different from those of usual concrete, are required for the overlay concrete in order to raise the bond strength to the existing concrete surface.

DISCLOSURE OF THE INVENTION

In the light of the speciality of the properties required for an overlay concrete for overlaying existing concrete fabrics in order to repair or remodel the fabrics by the above-mentioned bonded overlay rehabilitation method or the like, an object of the present invention is to provide an overlay concrete which is good in bond to the surfaces of the existing concrete fabrics; and which satisfies properties required for usual concrete, such as strength, durability and workability. Another object of the present invention is to provide such an overlay concrete that, when being applied to a concrete pavement, its formed surface itself can become a pavement surface, and to provide a bonded overlay rehabilitation method using the above-mentioned overlay concrete.

The inventors have been making tests and investigations to attain the above-mentioned objects. As a result, the inventors have found that a concrete having a specific mix proportion becomes an overlay concrete which can attain the above-mentioned objects, that is, which is good in bond to the surface of existing concrete fabrics and can satisfy properties such as strength, durability and workability. Thus, the present invention has been made.

That is, the present invention is an overlay concrete comprising an AE water reducing agent or superplastisizer, and having a slump of 2 to 8 cm, a cement-water ratio of 35 to 45%, and a sand-coarse aggregate ratio of 36 to 42%.

The overlay concrete having this mix proportion is good in filling performance into texture present at the surface of existing concrete fabrics and the involvement performance of scraps. The present overlay concrete also has small drying shrinkage, so that less delamination or stress arises at a joint interface. Thus, a new concrete layer having a high bond strength can be formed on the existing concrete fabrics.

Preferably, the overlay concrete further comprises an organic shrinkage reducing agent.

If the concrete comprises the organic shrinkage reducing agent, the amount of drying shrinkage when the concrete is hardened is further reduced so that less cracks arise. The generation of delamination or the stress at the joint interface is further suppressed. Advantageously, therefore, the bond strength to existing stress fabrics becomes higher.

In order to overlay existing concrete fabrics with the overlay concrete according to the present invention, it is preferred to jet highly-pressured water on the surface of an existing concrete fabric by water jet to form macro-texture, jet small and hard balls composed of a metal such as iron onto the macro-texture by shot blast to form micro-texture, and overlay the surface of the existing concrete with the overlay concrete, with vibration, as disclosed in Japanese Patent Application Laid-Open No. 9-71902.

According to this bonded overlay rehabilitation method, it is possible to form easily and promptly numerous macro-texture and micro-texture, into which the overlay concrete of the present invention will be inserted in a wedge manner, without making the strength of the surface layer of the existing concrete weak. Therefore, it is possible to make the best use of the properties of the overlay concrete of the present invention, such as high filling performance into the texture, high involvement performance of scraps, and low drying shrinkage when the concrete is hardened, and form the new concrete layer having a high bond strength at the joint interface on existing concrete fabrics for a short time.

Concerning the vibration applied when the surface of an existing concrete having macro- and micro-texture is overlaid with the overlay concrete of the present invention, the frequency of the vibration is preferably from 2600 to 3700 vpm, and the time for applying the vibration is preferably from 10 to 60 seconds.

If the frequency of the vibration and the time for applying the vibration are out of the above-mentioned ranges, the overlay concrete of the present invention is not sufficiently compacted. Moreover, the involvement performance of scraps deteriorates.

The overlay concrete of the present invention is a concrete having a slump of 2–8 cm; a flexural strength, after hardening of the concrete, of 57 kgf/cm$^2$ or more; and a compressive strength of about 500 kgf/cm$^2$. Concrete fabrics having such properties can be naturally applied to use besides concrete pavements. Various panels, coatings, or the like can be applied onto the overlay concrete.

BEST MODES FOR CARRYING OUT THE INVENTION

Referring to the attached drawings, the present invention will be more specifically described.

As described above, the overlay concrete of the present invention is a concrete comprising an AE water reducing agent or superplastisizer, and having a slump of 2 to 8 cm, a cement-water ratio of 35 to 45%, and a sand-coarse aggregate ratio of 36 to 42%.

The slump is set to a value from 2 to 8 cm for the following reasons. Any concrete having a slump of less than 2 cm is not sufficiently compacted. Thus, the filling performance to texture of the surfaces of existing concrete fabrics becomes bad, and further various inconveniences are caused. For example, good finishing becomes impossible. Any concrete having a slump over 8 cm is vibrated by the vibration of a compacting machine, so as to be fluid. Thus, inconveniences as follows are caused: for example, desired cross slope and gradients cannot be obtained. In either case, the concrete is unsuitable for an overlay concrete for overlaying existing concrete fabrics (in particular, concrete pavement) to repair or remodel the fabrics.

The best slump is about 6 cm, which makes mechanical working, with a concrete finisher or the like, easily.

The consistency of any concrete that is relatively hard kneaded as above is typically according to "Vibrating table consistency test (JSCE-F501-1974)" defined in "Standard Specification for Design and Construction of Concrete Structures PART 5". The consistency is represented as a settling degree (unit: second).

The settling degree varies in the concretes having the same slump, according to their composition and their raw materials. In the case of the concretes of the present invention, the settling degree of the concrete having a slump of 2 cm is 20–45 seconds and the settling degree of the concrete having a slump of 8 cm is 5–15 seconds. Concerning the overlay concrete of the present invention, therefore, the settling degree measured according to the above-mentioned method is within the range of 5 to 45 seconds.

The overlay concrete of the present invention comprises an As water reducing agent, or a superplastisizer. In order to prevent delamination or stress from being generated in a joint interface as described above, it is necessary for any overlay concrete to suppress drying shrinkage as much as possible. For this, a water content per unit volume of concrete should be reduced (for example, the water content per unit volume of concrete is 120–140 kg/m$^3$), so as to suppress the segregation of the concrete when it is compacted by vibration, suppress drying shrinkage when it is hardened, and make filling performance and the involvement performance of the scraps good. Thus, the above-mentioned AE water reducing agent or superplastisizer is necessary.

As the AE water reducing agent, there may be used, for example, lignin sulfonic acid compound [trade name: Pozzolith No. 7, made by NMB Co., Ltd.]. The added percentage thereof is preferably from, for example, about 0.25 to 2.0% by weight of the cement.

As the superplastisizer, there may be used, for example, polycarboxylic acids [trade name: Rheobuild SP-8N and Rheobuild SP-8S, made by NMB Co., Ltd.] or naphthalene derivatives [trade name: Rheobuild SP-9N, made by NMB Co., Ltd.]. The added percentage thereof is preferably from, for example, about 0.5 to 2.0% by weight of the cement.

Considering the finishability in hot weather, it is preferred to use, as the superplastisizer, retardation type one, for example, naphthalene derivatives [trade name: Rheobuild SP-9R, made by NMB Co., Ltd.]. These superplastisizer may be combined with a retarder [trade name: Pozzolith No. 89, made by NMB Co., Ltd.].

Further, in the overlay concrete of the present invention, the cement-water ratio is set to a value from 35 to 45%. This is because the concrete having a cement-water ratio within this range can satisfy properties, such as the strength required for overlay concrete [for example, flexural strength: 57 kgf/cm$^2$ or more, and compressive strength: about 500 kgf/cm$^2$ (the age of the concrete: 28 days)] and durability.

The best cement-water ratio is about 40%.

The used cement is normal Portland cement, low-heat Portland cement, moderate-heat Portland cement, high Aearly-strength Portland cement, Portland blast-furnace slug cement, or fly ash cement. Considering the finishability in hot weather, low-heat type cement, in particular low-heat Portland cement is preferred. If this is used, desired performances are satisfied and deterioration with the passage of time is reduced. Thus, the finishability is good.

The used water may tap water, ground water, river water or the like.

In the overlay concrete of the present invention, its sand-coarse aggregate ratio, that is, the ratio of fine aggregates in aggregates (coarse and fine aggregates) is set to a value from 36 to 42%. This sand-coarse aggregate ratio is greatly concerned with the involvement performance of scraps. If the sand-coarse aggregate ratio is more than the upper limit of this range or less than the upper limit thereof, the involvement performance of scraps deteriorates in either case.

The best sand-coarse aggregate ratio is about 38%.

The used coarse aggregates may be natural aggregates such as river gravel, pit gravel or sea gravel, or artificial aggregates such as crushed stones produced by crushing rocks or stones. Considering workability, the filling performance and the involvement performance of scraps, it is preferred to set the maximum size of the coarse aggregates to about 20 mm.

The used fine aggregates may be natural aggregates such as river sand, mountain sand or sea sand, or artificial aggregates such as crushed sand produced by crushing rocks or stones.

It is preferred that the overlay concrete of the present invention further comprises, as an admixture ingredient, an organic shrinkage reducing agent, in addition to the above-mentioned AE water reducing agent or superplastisizer.

The concrete comprising the organic shrinkage reducing agent causes the amount of drying shrinkage to decrease still more at the time of hardening of the concrete so that the generation of cracks is reduced, and causes the generation of delamination or stress to be further reduced at a joint interface. Thus, higher bond strength to an existing concrete fabric is favorably obtained.

As the organic shrinkage reducing agent, there may be used, for example, a lower alcohol alkylene oxide additive [trade name: Asano Tetraguard $AS_{21}$, made by Nihon Cement Co., Ltd.]. The added amount thereof is preferably, for example, in the range from about 3.0 to about 9.0 kg/m$^3$.

In the case of using both of the AE water reducing agent and the organic shrinkage reducing agent, or both of the superplastisizer and the organic shrinkage reducing agent, for example, the added percentage of the superplastisizer is preferably about 1.6% by weight of the cement and the added amount of the organic shrinkage reducing agent is preferably 6.0 kg/m$^3$.

If necessary, various organic polymers that have been conventionally used, besides the above, may be added to the overlay concrete of the present invention so far as the involvement performance of scraps and the like do not deteriorate. As an expansive additive, a lime-base or CSA-based additive may be used. The used amount thereof is preferably from 20 to 40 kg/m$^3$, and most preferably about 30 kg/m$^3$.

The overlay concrete of the present invention may be produced by any conventional method and device.

The above has described the embodiments of the overlay concrete of the present invention, but these embodiments, in particular, the described materials and added percentages of the AE water reducing agent, the superplastisizer, the organic shrinkage reducing agent and the expansive additive are only examples. The technical scope of the overlay concrete of the present invention is not limited to the above-mentioned description.

Therefore, in order to attain the use object or function of the respective admixture ingredients most effectively in accordance with the situation of the spot, it is possible to select and use appropriate materials and added percentage at will. Concerning the AE water reducing agent, the superplastisizer, the organic shrinkage reducing agent, and the expansive additive, all materials and added percentages thereof which are selected for the contribution to the attainment of the object of the present invention are included in the technical scope of the present invention.

As an existing concrete fabric which is overlaid with the overlay concrete of the present invention, there is designated any fabric produced by hardening of cement paste, cement mortal or cement concrete. Its shape is not especially limited. The existing concrete fabric includes any one of concrete fabrics which need to be overlaid with a new concrete for repair or remodeling. The present invention is in particular effective for the case that the concrete fabric is a concrete pavement and the overlay concrete is used as a material of a concrete pavement to be newly paved.

The following will describe the bonded overlay rehabilitation method using the overlay concrete of the present invention by way of an example for a concrete pavement.

Figure 1:
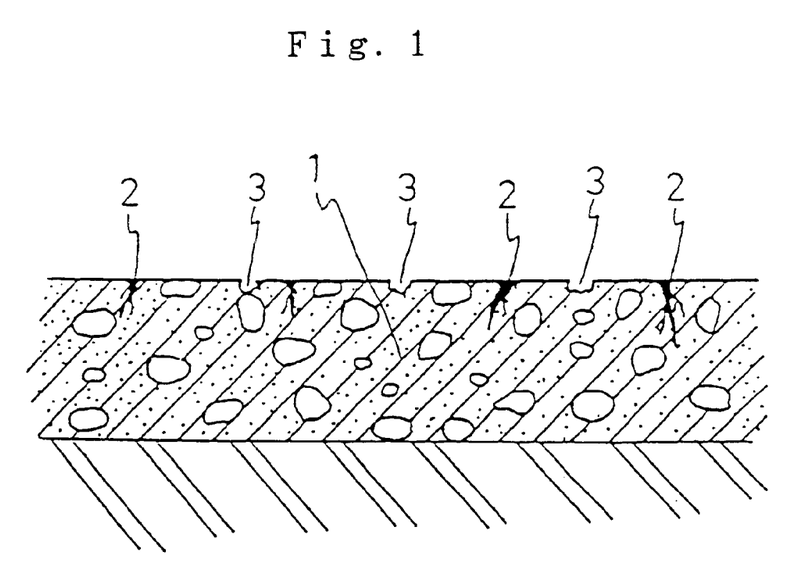
FIG. 1 is a cross section of an old, existing concrete pavement.

Referring to FIG. 1, cracks 2 and injuries 3 such as texture generated in a surface layer of an existing concrete pavement 1 are first cut by water jet, to form macro-texture 4 at the surface of the concrete pavement 1.

Figure 2:
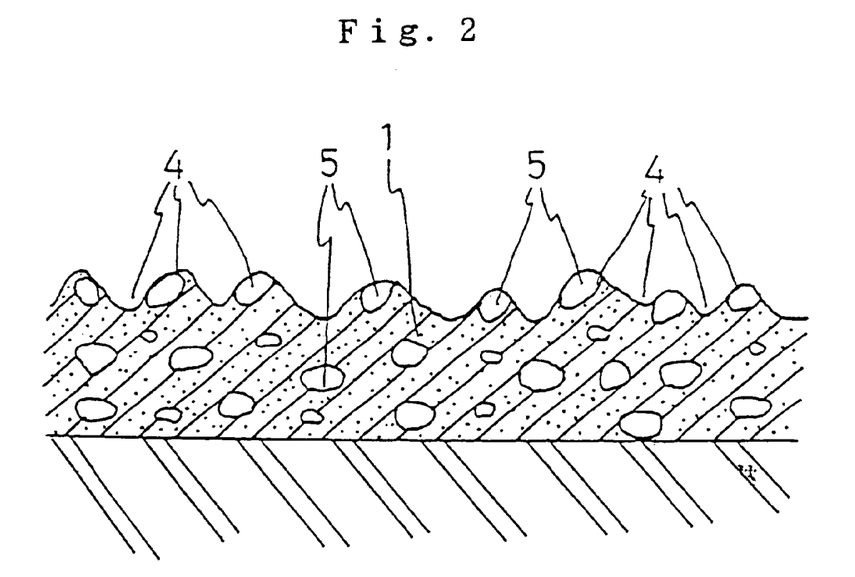
FIG. 2 is a cross section of a state in which macro-texture is formed at the surface of an existing concrete pavement by water jet.

A water jet wheel is used for the water jet. The water jet wheel is connected to a power unit wheel having a water tank, and has a highly pressured water jet nozzle for jetting highly pressured water. From the nozzle, the highly pressured water is jetted to the surface layer of the existing concrete pavement 1 to form the macro-texture 4 at the surface of the existing concrete pavement 1, as shown in FIG. 2.

Since the highly pressured water is jetted in the case of the water jet, the cracks 2 and the injuries 3 such as texture, which are weak portions of the surface layers, are removed to form the macro-texture. Since the texture is formed in the state that it keeps away from aggregates 5, there is an advantage that the surface strength is hardly weakened.

Figure 3:
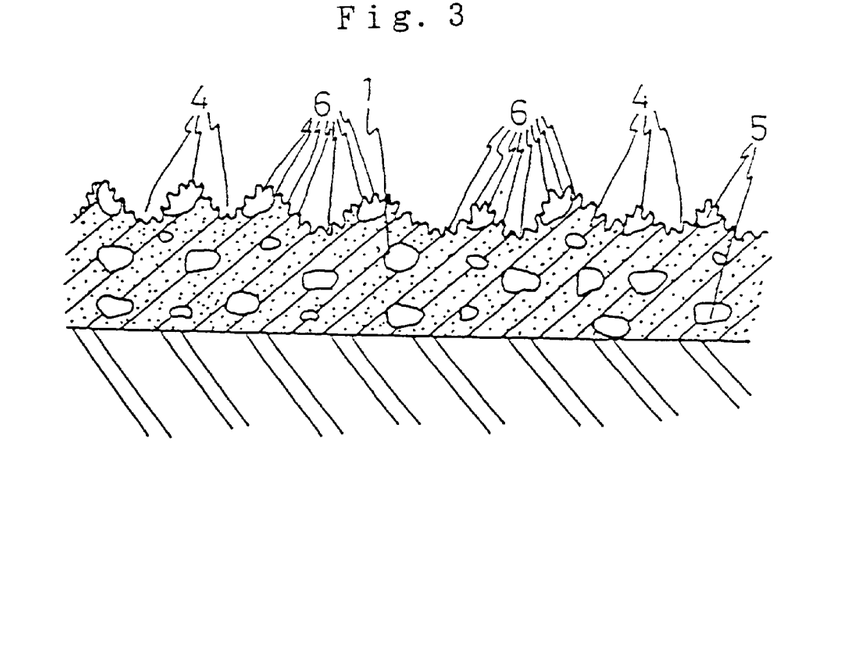
FIG. 3 is a cross section of a state in which micro-texture is formed at the surface of the existing concrete pavement by shot blast.

Next, by shot blasting, micro-texture 6 is formed at the surface of the macro-texture 4 formed by the water jet.

In the shot blasting, shot materials such as grids or steel balls having a small particle size are used. These shot materials are hit at a high speed onto the macro-texture 4 from the above, so as to form the micro-texture 6 at the surface of the macro-texture 4 or at the surface of the exposed aggregates 5.

Figure 4:
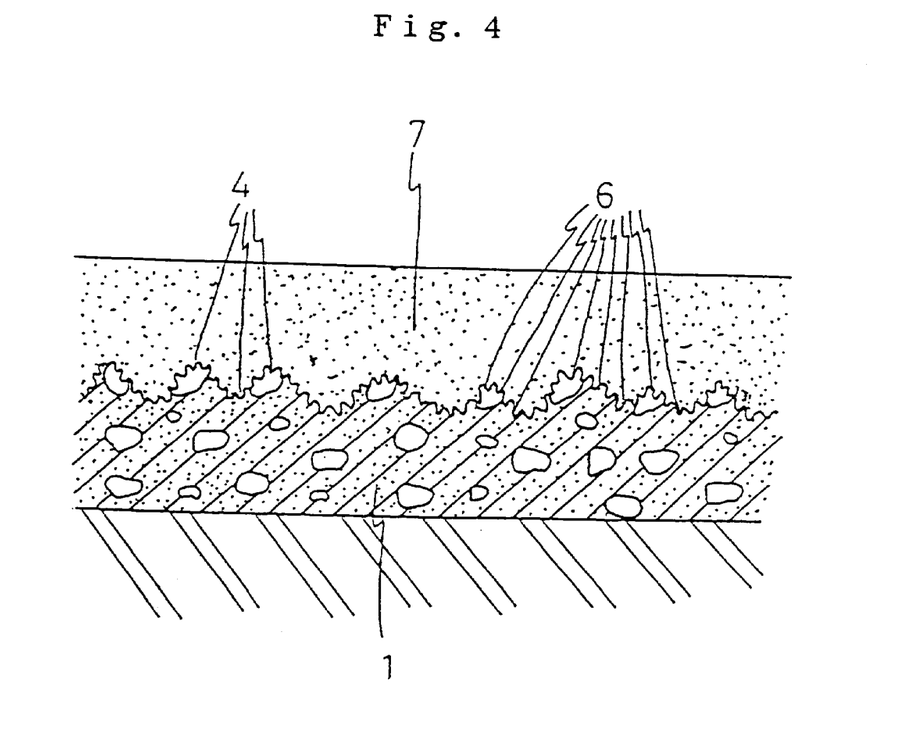
FIG. 4 is a cross section of a state in which the existing concrete pavement having the macro- and micro-texture is overlaid with the overlay concrete to form a new concrete layer on the existing concrete pavement.

Subsequently, the surface of the existing concrete pavement 1 having the macro- and micro-texture 4 and 6 formed by the combination of the water jet and the shot blast is overlaid with the overlay concrete of the present invention. The overlay concrete is uniformly spread with a concrete finisher or the like, and compacted by vibration and finishing to form a concrete layer 7 having a given thickness on the surface of the existing concrete pavement 1, as shown in FIG. 4.

The concrete layer 7 formed by the above-mentioned bonded overlay rehabilitation method has good bond to the existing concrete pavement 1 and is excellent in strength and durability for the following reasons.

The macro-texture 4 and micro-texture 6 are numerously formed at the surface of the existing concrete pavement 1, which will be a joint interface, by the combination of the water jet and the shot blast. Therefore, the overlay concrete of the present invention, which is good in the filling performance a and the involvement performance of scraps, is inserted in a wedge manner into the texture 4 and 6. Moreover, the overlay concrete of the present invention exhibits a small amount of drying shrinkage. Therefore, when the overlay concrete inserted in a wedge manner into the texture 4 and 6 is hardened, the generation of delamination or stress is reduced. As a result, it is possible to form the concrete layer 7 having a highly improved bond strength to the existing concrete pavement 1 by the anchor effect.

In the case of the above-mentioned concrete pavement, the running speed of the concrete finisher or the like, which is used for spreading the overlay concrete of the present invention uniformly and performing compaction by vibration and finishing, is preferably such a speed that the time for the compaction of the overlay concrete by vibration is at least 10 seconds and at most 60 seconds.

If the time for the compaction by vibration is less than 10 seconds, insufficient are the filling performance of the overlay concrete of the present invention into the texture 4 and 6 which are present at the existing concrete pavement 1 and the involvement performance of scraps into the overlay concrete. Thus, it is difficult to form the concrete layer 7 having a high bond strength. If the time for the compaction by vibration is more than 60 seconds, the above-mentioned filling performance and involvement performance are not raised very much. Thus, the improvement in the bond strength is not expected. Besides, it is feared that in the overlay concrete of the present invention itself the segregation is unfavorably generated. The concrete finisher or the like at this time may be a concrete finisher which has been conventionally used for pavements.

The curing of the overlay concrete of the present invention after finishing is preferably moist curing, which aids advantageous for the improvement in raw material strength and suppression of drying shrinkage. This is because the moist curing causes the bond strength to be improved still more than atmospheric curing. The curing with the spray of an curing agent is preferable. As the curing agent used in this case, there may be used an existing curing agent such as Toughrox, made by Chichibu Industry Co., Ltd.

[Test Examples]

The following will describe test examples resulting in the completion of the overlay concrete of the present invention and the bonded overlay rehabilitation method using the overlay concrete.

Evaluation Tests of Overlay Concretes (Tests No. 1 to 34)

1. Production of overlay concretes

Raw materials shown in Table 1 were kneaded and mix proportion shown in Table 2 in a biaxial forced mixing type mixer to produce overlay concretes.

TABLE 1

| Kinds of raw materials | | Trade name | Physical properties (main component) | Maker and habitat |
|---|---|---|---|---|
| Cement | Normal Portland cement | — | Specific gravity; 3.15 | Nihon Cement Co., Ltd. |
| Admixture | Expansive additive | Asano Gypcal | Specific gravity; 2.95 | Nihon Cement Co., Ltd. |
| Chemical admixture | Air entrapping and water reducing agent | Pozzolith No. 70 | Lignin sulfonic acid compound | NMB Co., Ltd. |
| | Superplastisizer | Rheobuild SP-8N | Polycarboxylic acid type | |
| | | Rheobuild SP-8S | Polycarboxylic acid type | |
| | | Rheobuild SP-9N | Naphthalene type | |
| | | Rheobuild SP-9R | Naphthatene type (delay-type) | |
| | Air entrapping agent | Pozzolith 303A | Anionic surfactant | |
| | Shrinkage reducing agent | Asono Tetraguard $AS_{21}$ | Lower alcohol | Nihon Cement Co., Ltd. |
| | Shrinkage reducing agent | Crack gard | Glycol ether | Hujisawa Pharmaceutical Co., Ltd. |
| Aggregate | Fine aggregate | — | Specific gravity under saturated surface-dry; 2.62 Absorption; 1.22% Fineness modulus; 2.47 | Land sand from Kashima |
| | Coarse aggregate | — | Gravity in saturated surface-dry condition; 2.66 Percentage of water absorption; 0.56% Fineness modulus; 670 Maximum size of coarse aggregates; 20 mm | Crushed stone from Kansas |

TABLE 2

Mix proportion of overlay concretes

| Test No. | w/c (%) | s/a (%) | Unit Weight (kg/m³) | | | | | | | Chemical admixture (C × %) | | | | |
|---|---|---|---|---|---|---|---|---|---|---|---|---|---|---|
| | | | W | C | S | G | $AS_{21}$[1] | F[1] | E | No.70 | SP-8N | SP-8S | SP-9N | 303A |
| 1 | 25.4 | 35 | 128 | 504 | 610 | 1,154 | — | — — | — | — | 1.8 | — | — | 0.002 |
| 2 | 30 | 38 | 128 | 427 | 688 | 1,140 | — | — — | — | — | 1.6 | — | — | 0.002 |

TABLE 2-continued

Mix proportion of overlay concretes

| Test No. | w/c (%) | s/a (%) | Unit Weight (kg/m³) | | | | | | | Chemical admixture (C × %) | | | | |
|---|---|---|---|---|---|---|---|---|---|---|---|---|---|---|
| | | | W | C | S | G | AS₂₁¹⁾ | F¹⁾ | E | No.70 | SP-8N | SP-8S | SP-9N | 303A |
| 3 | 35 | 37 | 128 | 366 | 689 | 1,192 | — | — — | — | — | 1.1 | — | — | 0.002 |
| 4 | | | 122 | 366 | 689 | 1,192 | 6 | — — | — | — | — | 1.1 | — | 0.024 |
| 5 | 40 | 35 | 128 | 320 | 665 | 1,254 | — | — — | — | — | 1.1 | — | — | 0.002 |
| 6 | | | 122 | 320 | 665 | 1,254 | — | — — | — | — | 1.1 | — | — | 0.024 |
| 7 | | 36 | 122 | 320 | 684 | 1,234 | 6 | — — | — | — | — | 1.1 | — | — |
| 8 | | | 130 | 340 | 670 | 1,210 | 6 | — — | — | — | — | 1.1 | — | — |
| 9 | | | 122 | 320 | 684 | 1,234 | 6 | — — | — | — | 1.1 | — | — | — |
| 10 | | | 130 | 340 | 670 | 1,210 | 6 | — — | — | — | 1.1 | — | — | 0.024 |
| 11 | | | 122 | 320 | 684 | 1,234 | 6 | — — | — | — | — | — | 1.1 | 0.024 |
| 12 | | | 128 | 320 | 684 | 1,234 | — | — — | — | — | 1.0 | — | — | 0.004 |
| 13 | | | 122 | 320 | 684 | 1,234 | 6 | — — | — | — | 1.1 | — | — | 0.024 |
| 14 | | 38 | 128 | 320 | 723 | 1,194 | — | — — | — | — | 1.0 | — | — | 0.002 |
| 15 | | | 136 | 340 | 707 | 1,173 | — | — — | — | — | 1.0 | — | — | 0.002 |
| 16 | | | 122 | 320 | 723 | 1,194 | 6 | — — | — | — | 1.1 | — | — | 0.024 |
| 17 | | | 130 | 340 | 707 | 1,173 | 6 | — — | — | — | 1.0 | — | — | 0.02 |
| 18 | | | 132 | 330 | 715 | 1,184 | — | — — | — | 0.25 | — | — | — | 0.001 |
| 19 | | | 126 | 330 | 715 | 1,184 | 6 | — — | — | 0.25 | — | — | — | 0.008 |
| 20 | | | 128 | 320 | 723 | 1,192 | — | — — | — | — | 1.0 | — | — | — |
| 21 | | | 122 | 320 | 723 | 1,194 | 6 | — — | — | — | 1.1 | — | — | — |
| 22 | | | 119 | 320 | 723 | 1,194 | 9 | — — | — | — | 1.2 | — | — | 0.024 |
| 23 | | | 122 | 290 | 723 | 1,194 | 6 | — 30 | | — | 1.0 | — | — | 0.024 |
| 24 | | 40 | 128 | 320 | 760 | 1,157 | — | — — | — | — | 1.0 | — | — | 0.002 |
| 25 | | | 135 | 340 | 744 | 1,136 | — | — — | — | — | 1.0 | — | — | 0.002 |
| 26 | | | 122 | 320 | 760 | 1,157 | 6 | — — | — | — | 1.1 | — | — | 0.024 |
| 27 | | 42 | 122 | 320 | 805 | 1,128 | 6 | — — | — | — | 1.1 | — | — | 0.024 |
| 28 | | | 122 | 320 | 804 | 1,127 | 6 | — 30 | | — | 1.1 | — | — | 0.024 |
| 29 | | 45 | 128 | 320 | 855 | 1,061 | — | — — | — | — | 1.0 | — | — | 0.002 |
| 30 | | | 122 | 320 | 855 | 1,061 | 6 | — — | — | — | 1.0 | — | — | 0.024 |
| 31 | 45 | 39 | 128 | 284 | 752 | 1,197 | — | — — | — | — | 1.0 | — | — | 0.002 |
| 32 | | | 122 | 284 | 752 | 1,197 | 6 | — — | — | — | 1.1 | — | — | 0.020 |
| 33 | 50 | 38 | 128 | 256 | 742 | 1,230 | — | — — | — | — | 1.0 | — | — | 0.001 |
| 34 | 62.3 | 50 | 162 | 260 | 930 | 944 | — | 6 — | — | — | 0.25 | — | — | 0.001 |

¹⁾AS₂₁ and F are regarded as a part of a water content per unit volume of concrete 2. Evaluations of the overlay concretes About the respective overlay concretes produced as above, their slump, air content, flexural strength, compressive strength, drying shrinkage, workability, involvement performance of scraps, and bond strength were measured.

The slump was measured according to JIS A 1101 "Method of test for slump of concrete". The air content was measured according to JIS A 1128 "Method of test for air conEetit of fresh concrete by pressure method". The flexural strength was measured according to JIS A 1106 "Method of test for flexural strength of concrete". The compressive strength was measured according to JIS A 1108 "Method of test for compressive strength of concrete". The drying shrinkage was measured according to JIS A 1129 "Method of test for length change of mortal and concrete"

The workability was judged with naked eyes and the sense of touch. Concretes having very good, good, slightly bad and bad workability are represented by ⊚, ○, Δ, and ×, respectively. About the involvement performance of scraps, existing concrete fabrics having macro- and micro-texture formed by a surface treatment were overlaid with the respective produced overlay concretes, using a plate compactor (frequency: 3100 vpm, and vibration periods: 30 seconds), in the manner that the thickness of the overlay concrete would be about 15 cm. Immediately after the overlaying, the overlay concretes were removed and then it was evaluated whether or not scraps remained on the exposed interface with naked eyes. Concretes having very good, good, slightly bad and bad involvement performances are represented by ⊚, ○, Δ, and ×, respectively. About the bond strength, a core of an existing concrete fabric (diameter: 15 cm, and height: 20 cm) having macro- and micro-texture by a surface treatment was fixed on the bottom inside a form (diameter: 15 cm, and height: 60 cm), and then the core was overlaid with each of the overlay concretes, using a plate compactor (frequency: 3100 vpm, and Dvibration periods: 30 seconds), in the manner that the thickness of the overlay would be about 20 cm. After moist curing for 28 days, pulling tools were fixed onto both end faces of the jointed test piece with an adhesive. Tensile strength was applied perpendicularly to the end faces of the jointed test piece, to perform a direct tensile test. In this way, a maximum load was obtained. The bond strength was calculated by dividing the maximum load by the sectional area of the jointed test piece.

The results are shown in Table 3.

TABLE 3

Properties of overlay concretes

| | Flexural strength, the age of the | Compressive strength, the age of the | Contraction | Involvement | Bond strength, the age of the |
|---|---|---|---|---|---|

| Test No. | Slump (cm) | Air content (%) | concretes: 28 days (kgf/cm²) | concretes: 28 days (kgf/cm²) | One week | Four week | Three months | Six months | Workability | perform-ance of scraps | concretes: 28 days (kgf/cm²) |
|---|---|---|---|---|---|---|---|---|---|---|---|
| | | | | | \multicolumn{4}{c}{(change in the length × 10⁻⁶)} | | | |
| 1 | 1.5 | 3.7 | 91.7 | 823 | 131 | 252 | 355 | 401 | X | X | 18.1 |
| 2 | 3.5 | 4.2 | 83.6 | 765 | 135 | 258 | 351 | 400 | X | X | 18.8 |
| 3 | 4.0 | 4.3 | 76.3 | 686 | 142 | 265 | 368 | 405 | ○ | ○ | 24.6 |
| 4 | 4.0 | 4.5 | 67.3 | 686 | 85 | 159 | 221 | 263 | ○ | ○ | 24.9 |
| 5 | 7.0 | 4.8 | 64.2 | 581 | 162 | 291 | 385 | 414 | Δ | Δ | 18.4 |
| 6 | 8.0 | 5.5 | 63.6 | 577 | 70 | 160 | 270 | 295 | Δ | Δ | 18.8 |
| 7 | 6.0 | 4.4 | 65.6 | 596 | 71 | 163 | 268 | 291 | Δ | ○ | 23.1 |
| 8 | 10.5 | 5.5 | 64.3 | 579 | 82 | 175 | 288 | 310 | Δ | ○ | 23.0 |
| 9 | 4.0 | 4.2 | 66.2 | 595 | 74 | 161 | 265 | 293 | ◎ | ◎ | 24.1 |
| 10 | 9.0 | 5.0 | 65.9 | 589 | 84 | 178 | 294 | 312 | ○ | ◎ | 23.8 |
| 11 | 5.5 | 4.0 | 65.8 | 585 | 73 | 164 | 265 | 287 | Δ | ○ | 23.4 |
| 12 | 6.0 | 3.9 | 67.8 | 605 | 162 | 290 | 395 | 426 | ◎ | ◎ | 24.5 |
| 13 | 8.4 | 4.8 | 66.5 | 598 | 71 | 152 | 268 | 306 | ◎ | ◎ | 23.9 |
| 14 | 6.5 | 4.5 | 67.6 | 603 | 166 | 296 | 394 | 435 | ◎ | ◎ | 24.6 |
| 15 | 9.7 | 4.3 | 65.7 | 598 | 180 | 306 | 414 | 448 | Δ | ○ | 23.2 |
| 16 | 6.5 | 4.3 | 66.1 | 592 | 82 | 165 | 250 | 295 | ○ | ◎ | 23.6 |
| 17 | 8.0 | 3.5 | 66.5 | 596 | 95 | 178 | 262 | 310 | ○ | ○ | 23.4 |
| 18 | 2.6 | 4.6 | 59.7 | 558 | 162 | 285 | 372 | 422 | ◎ | ○ | 23.0 |
| 19 | 3.1 | 4.8 | 57.9 | 573 | 62 | 165 | 250 | 295 | ◎ | ○ | 23.2 |
| 20 | 4.3 | 2.8 | 66.1 | 592 | 172 | 300 | 400 | 430 | ○ | ○ | 23.3 |
| 21 | 4.5 | 2.9 | 60.7 | 622 | 78 | 168 | 280 | 310 | ○ | ○ | 23.5 |
| 22 | 6.4 | 5.2 | 61.5 | 624 | 45 | 140 | 208 | 285 | ◎ | ◎ | 23.8 |
| 23 | 6.6 | 4.6 | 57.9 | 549 | 69 | 164 | 225 | 265 | ◎ | ◎ | 23.3 |
| 24 | 6.3 | 4.3 | 63.2 | 602 | 175 | 305 | 405 | 425 | ○ | ○ | 24.3 |
| 25 | 7.8 | 4.9 | 64.6 | 594 | 195 | 323 | 420 | 438 | ○ | ○ | 24.8 |
| 26 | 7.2 | 4.5 | 63.8 | 588 | 78 | 166 | 282 | 312 | ○ | ○ | 25.4 |
| 27 | 6.6 | 4.6 | 63.6 | 590 | 80 | 172 | 288 | 320 | ○ | ○ | 25.1 |
| 28 | 6.4 | 4.8 | 63.7 | 594 | 68 | 161 | 232 | 275 | ○ | ○ | 24.9 |
| 29 | 5.5 | 4.4 | 62.1 | 585 | 179 | 308 | 406 | 438 | Δ | Δ | 20.4 |
| 30 | 5.0 | 4.8 | 63.5 | 594 | 82 | 175 | 285 | 320 | Δ | Δ | 20.6 |
| 31 | 5.4 | 4.2 | 56.3 | 504 | 182 | 311 | 415 | 442 | ○ | ○ | 22.3 |
| 32 | 5.6 | 4.4 | 54.5 | 564 | 92 | 178 | 300 | 335 | ○ | ○ | 21.8 |
| 33 | 5.3 | 4.5 | 49.9 | 445 | 195 | 324 | 431 | 452 | X | X | 17.2 |
| 34 | 9.5 | 4.5 | 44.8 | 331 | 161 | 375 | 605 | 770 | X | X | 16.4 |

Evaluation Test of the Bonded Overlay Rehabilitation Method (Tests No. 35–59)

1. Overlay concretes

As overlay concretes, there were used concretes having the compositions of Test Nos. 20 and 21, about which good results were obtained in the evaluation test of the overlay concretes.

2. Overlay conditions (Bonded overlay rehabilitation method)

Cores of existing concrete fabrics (diameter: 15 cm, and height: 20 cm) subjected to various surface treatments shown in Table 4 were fixed on the bottom inside molds (diameter: 15 cm, and height: 60 cm), and then the cores were overlaid with the overlay concretes, using a plate compactor, at various frequencies and for various time for the vibration shown in Table 4 in the manner that the thickness of the overlays would be about 20 cm. Thereafter, the resultants were subjected to moist curing or atmospheric curing for 28 days.

3. Evaluation of the bonded overlay rehabilitation method

About the respective jointed test pieces obtained by the above-mentioned overlay conditions, their aperture area and bond strength were measured.

About the aperture area, the jointed test pieces were lengthwise cut and then the area of the portion that was not jointed among the jointed interface was measured with an image processor [Gazou Hakase, made by Kawasaki Steel Corp.]. About the bond strength, pulling tools were fixed onto both end faces of the respective jointed test pieces with an adhesive. Tensile strength was applied perpendicularly to the end faces of the respective jointed test pieces, to perform a tensile test. In this way, a maximum load was obtained. The bond strength was calculated by dividing the maximum load by the sectional area of the jointed test piece.

The results are also shown in Table 4.

TABLE 4

| | | Overlay conditions | | | | | State of the jointed portion | |
|---|---|---|---|---|---|---|---|---|
| | | Surface treatment (kg/cm²) | | Conditions of compaction by vibration | | | | |
| Test No. | Used overlay concretes | Water jet | Shot blast | Frequency of the vibration (vpm) | Vibration periods (sec) | Curing condition | Aperture area (mm²) | Bond strength (kgf/cm²) |
| 35 | Overlay concrete of Test No. 21 | — | 250 | 3100 | 30 | Wet | 74.0 | 19.1 |
| 36 | | 1900 | — | 3100 | 30 | Wet | 83.0 | 19.8 |
| 37 | | 1900 | 250 | 2000 | 30 | Wet | 108.0 | 20.2 |

TABLE 4-continued

| | | Overlay conditions | | | | | State of the jointed portion | |
|---|---|---|---|---|---|---|---|---|
| | | Surface treatment (kg/cm²) | | Conditions of compaction by vibration | | | | |
| Test No. | Used overlay concretes | Water jet | Shot blast | Frequency of the vibration (vpm) | Vibration periods (sec) | Curing condition | Aperture area (mm²) | Bond strength (kgf/cm²) |
| 38 | | | | 2300 | 30 | Wet | 98.0 | 21.3 |
| 39 | | | | 2600 | 10 | Wet | 200.6 | 15.1 |
| 40 | | | | | 20 | Wet | 91.2 | 19.8 |
| 41 | | | | | 30 | Wet | 38.8 | 23.7 |
| 42 | | | | 3100 | 0 | Wet | 285.0 | 6.5 |
| 43 | | | | | 10 | Wet | 116.6 | 21.2 |
| 44 | | | | | 20 | Wet | 77.5 | 22.1 |
| 45 | | | | | 30 | Wet | 64.3 | 23.5 |
| 46 | | | | | | Air | 60.5 | 21.8 |
| 47 | | | | | 60 | Wet | 41.1 | 23.4 |
| 48 | | | | | 70 | Wet | 35.6 | 20.2 |
| 49 | | | | 3700 | 10 | Wet | 127.0 | 21.1 |
| 50 | | | | | 20 | Wet | 59.5 | 23.9 |
| 51 | | | | | 30 | Wet | 46.3 | 24.3 |
| 52 | | | | 4000 | 30 | Wet | 36.8 | 22.2 |
| 53 | | | | 4500 | 30 | Wet | 39.1 | 21.7 |
| 54 | Overlay concrete of Test No. 20 | 1900 | 250 | 3100 | 10 | Wet | 144.0 | 18.2 |
| 55 | | | | | 20 | Wet | 25.7 | 20.9 |
| 56 | | | | | 30 | Wet | 92.2 | 23.9 |
| 57 | | | | | | Air | 87.2 | 21.1 |
| 58 | | | | | 60 | Wet | 62.3 | 21.8 |
| 59 | | | | | 70 | Wet | 51.4 | 20.4 |

Evaluation Test of Finishability (Test Nos. 60–64)

1. Overlay concretes

When a normal Portland cement was used as a cement, its finishability was not very good in hot weather (in the case of high atmosphere temperature). Thus, there was used belite type cement [Asano Low-Heat Portland Cement, made by Nihon cement Co., Ltd., specific gravity: 3.22], which was a low-heat type cement. As a superplastisizer, a delay type of Rheobuild SP-9N [RheobuildSP-9R, made by NMB Co., Ltd.] was added thereto. Other materials shown in Table 1 were blended with it and kneaded at ratios shown in Table 5 in biaxial compulsion mixer to produce overlay concretes.

2. Evaluation of the overlay concretes

About the respective overlay concretes produced as above, their slump, air content, flexural strength, compressive strength, drying shrinkage, workability, involvement performance of scraps, and bond strength were measured in the same way as above.

The obtained results are shown in Table 6. The finishability of all the overlay concretes was good. The hardening speed of the belite type cement is slow, so that the cement having the age of 28 days does not have sufficient strength. Therefore, the flexural strength, the compressive strength and bond strength thereof were measured when its age was 91 days.

TABLE 5

| | | | Mix proportion of overlay concretes | | | | | | | | | | | |
|---|---|---|---|---|---|---|---|---|---|---|---|---|---|---|
| Test | w/c | s/a | Unit weight (kg/m²) | | | | | | | Chemical admixture (C × %) | | | | |
| No. | (%) | (%) | W | C | S | G | $AS_{21}^{1)}$ | $F^{1)}$ | E | No.70 | SP-8N | SP-8S | SP-9N | SP-9R | 303A |
| 60 | 40 | 38 | 122 | 320 | 730 | 1,210 | 6 | — | — | — | 1.0 | — | — | — | 0.002 |
| 61 | | | 122 | 320 | 730 | 1,210 | 6 | — | — | — | — | 1.0 | — | — | 0.002 |
| 62 | | | 122 | 320 | 730 | 1,210 | 6 | — | — | — | — | — | 1.0 | — | 0.002 |
| 63 | | | 122 | 320 | 730 | 1,210 | 6 | — | — | — | — | — | — | 1.0 | 0.002 |
| 64 | | | 122 | 290 | 730 | 1,210 | 6 | — | 30 | — | 1.0 | — | — | — | 0.002 |

[1)] $AS_{21}$ and F are regarded as a part of a water content per unit volume of concrete

TABLE 6

Properties of overlay concretes

| Test No. | Slump (cm) | Air content (%) | Flexural strength (kgf/cm²) | | Compressive strength (kgf/cm²) | | Contraction (change in the length × $10^{-6}$) | | | | Work-ability | Involvement performance of scraps | Bond strength (kgf/cm²) | |
|---|---|---|---|---|---|---|---|---|---|---|---|---|---|---|
| | | | Age of the concretes :28 days | Age of the concretes :91 days | Age of the concretes :28 days | Age of the concretes :91 days | One week | Four week | Three months | Six months | | | Age of the concretes: 28 days | Age of the concretes: 91 days |
| 60 | 6.8 | 4.6 | 49.6 | 68.1 | 482 | 687 | 38 | 103 | 195 | 235 | ◎ | ◎ | 18.6 | 24.6 |
| 61 | 7.0 | 4.8 | 49.3 | 66.2 | 476 | 680 | 35 | 105 | 190 | 240 | ◎ | ◎ | 18.9 | 24.8 |
| 62 | 7.0 | 4.9 | 49.5 | 68.5 | 478 | 682 | 31 | 109 | 186 | 238 | ◎ | ◎ | 19.0 | 25.0 |
| 63 | 7.5 | 5.0 | 50.0 | 68.8 | 485 | 691 | 34 | 100 | 191 | 234 | ◎ | ◎ | 19.1 | 24.1 |
| 64 | 6.5 | 4.6 | 48.2 | 67.1 | 472 | 679 | 25 | 125 | 196 | 226 | ◎ | ◎ | 18.8 | 23.9 |

The above-mentioned overlay concrete of the present invention is good in filling performance into texture present at the surface of existing concrete fabrics and involvement performance of scraps. The present overlay concrete also has a small drying shrinkage, so that the generation of delamination or stress is reduced in a joint interface. Thus, a new concrete layer having a high bond strength can be formed on the existing concrete fabrics.

According to the above-mentioned bonded overlay rehabilitation method of the present invention, it is possible to form easily and promptly numerous macro-texture and micro-texture, into which the overlay concrete of the present invention is to be inserted in a wedge manner, without making the strength of the surface layer of the existing concrete weak. Therefore, it is possible to make the best use of the properties of the overlay concrete of the present invention, such as high filling performance into the texture, high involvement performance of scraps, and low drying shrinkage when the concrete is hardened, and form the new concrete layer having a high bond strength in a joint interface on existing concrete fabrics for a short time.

What is claimed is:

1. A method for overlaying a concrete fabric, comprising:
    forming a macro-texture on a surface of an existing concrete fabric by jetting highly pressured water by using a water jet;
    forming a micro-texture by jetting small particles onto the macro-texture thus formed by using a shot blast; and
    overlaying the surface of the existing concrete fabric thus formed with an overlay concrete while applying vibration thereto;
    wherein said overlay concrete comprises one selected from the group consisting of an AE reduction agent and superplastisizer, and has a slump of 2 to 8 cm, a cement-water ratio of 35 to 45%, and a sand-coarse aggregate ratio of 36 to 42%.

2. The method of claim 1, wherein said overlay concrete farther comprises an organic shrinkage reducing agent.

3. The method of claim 2, wherein a cement in said overlay concrete comprises a low-heat Portland cement.

4. The method of claim 2, wherein the existing concrete fabric is a concrete pavement.

5. The method of claim 1, wherein a cement in said overlay concrete comprises a low-heat Portland cement.

6. The method of claim 5, wherein the existing concrete fabric is a concrete pavement.

7. The method of claim 1, wherein the existing concrete fabric is a concrete pavement.

8. The method of claim 1, wherein frequency of the vibration is from 2600 to 3700 vpm, and time period for applying the vibration is from 10 to 60 seconds.

* * * * *